(12) United States Patent
Thomas et al.

(10) Patent No.: US 6,363,730 B1
(45) Date of Patent: Apr. 2, 2002

(54) METHOD AND APPARATUS FOR CRYOGENIC COOLING

(75) Inventors: Michael R. Thomas, Effingham, IL (US); Robert H. Bessemer, Pittsburgh, PA (US)

(73) Assignee: The Conair Group, Inc., Pittsburgh, PA (US)

( * ) Notice: Subject to any disclaimer, the term of this patent is extended or adjusted under 35 U.S.C. 154(b) by 0 days.

(21) Appl. No.: 09/593,426

(22) Filed: Jun. 14, 2000

Related U.S. Application Data
(60) Provisional application No. 60/189,575, filed on Mar. 15, 2000, and provisional application No. 60/189,576, filed on Mar. 15, 2000.

(51) Int. Cl.[7] .......................... F25D 25/00; B29C 71/00
(52) U.S. Cl. ...................... 62/62; 62/DIG. 10; 264/237
(58) Field of Search ..................... 62/186, 378, 380, 62/62; 214/DIG. 10, 28, 528, 237, 177.19

(56) References Cited

U.S. PATENT DOCUMENTS

| | | | |
|---|---|---|---|
| 3,892,104 A | * | 7/1975 | Klee et al. ..................... 62/186 |
| 4,029,452 A | | 6/1977 | Schippers et al. |
| 4,181,487 A | | 1/1980 | Kessler |
| 4,212,171 A | | 7/1980 | Soecknick |
| 4,401,424 A | | 8/1983 | De Zen |
| 4,452,752 A | | 6/1984 | Harder et al. |
| 4,654,094 A | | 3/1987 | Ritter |
| 4,755,118 A | * | 7/1988 | Ondush et al. |
| 4,757,691 A | * | 7/1988 | Compagnon ................... 62/63 |
| 4,947,654 A | * | 8/1990 | Sink et al. .................... 62/186 |
| 5,108,277 A | * | 4/1992 | Dixon |
| 5,316,459 A | | 5/1994 | Melkonian et al. |
| 5,340,295 A | | 8/1994 | Preiato et al. |
| 5,525,289 A | | 6/1996 | Lupke et al. |
| 5,605,049 A | * | 2/1997 | Moore et al. .................. 62/63 |
| RE36,585 E | | 2/2000 | Purstinger |
| 6,066,288 A | * | 5/2000 | Purstinger |

FOREIGN PATENT DOCUMENTS

DE        1 923 490        11/1970

* cited by examiner

*Primary Examiner*—William C. Doerrler
(74) *Attorney, Agent, or Firm*—Buchanan Ingersoll, P.C.

(57) ABSTRACT

A method and apparatus for using vaporized liquid cryogen to cool articles, particularly extrusions, utilizing dispersion of liquid cryogen into a chamber wherein it is substantially vaporized and then circulated through cooling circuits in a tool for cooling the tool, or an article such as an extrusion which is to be cooled by the tool. Additionally, the tool may itself be disposed in a cooling chamber in which vaporized cryogen is circulated to cool the tool and the article.

58 Claims, 9 Drawing Sheets

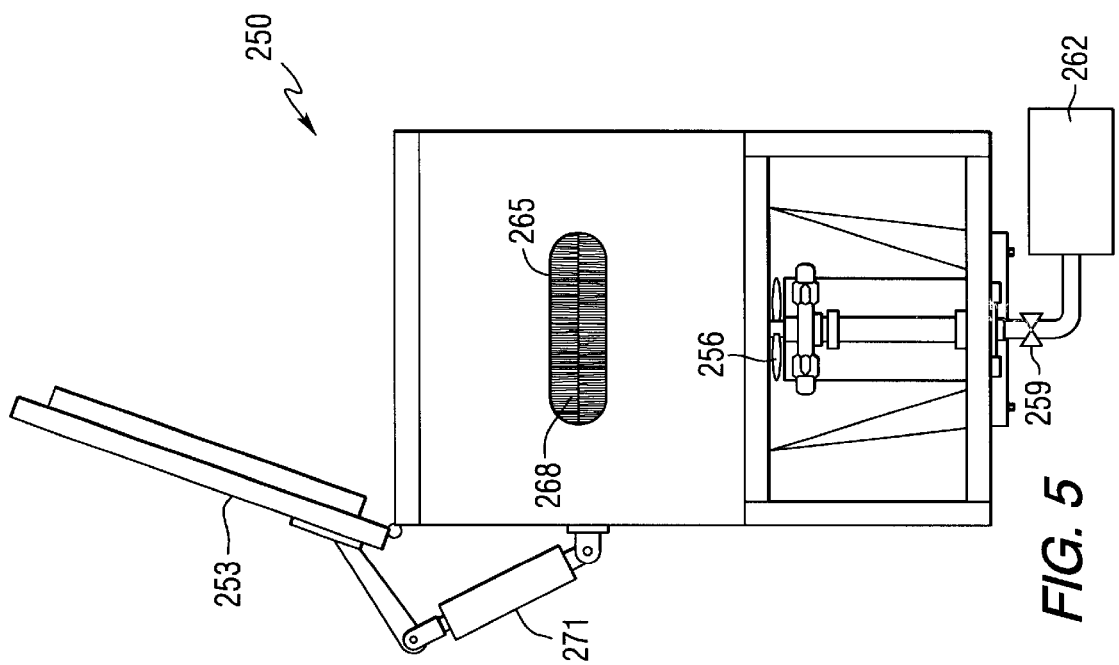
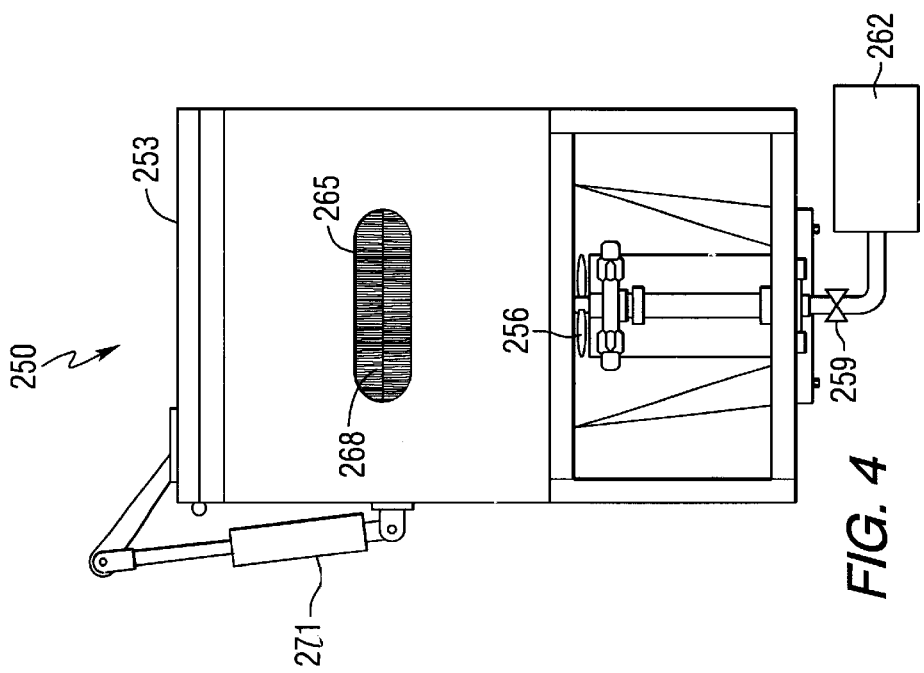
FIG. 5
FIG. 4

METHOD AND APPARATUS FOR CRYOGENIC COOLING

RELATED APPLICATIONS

This application is based upon pending United States Provisional Patent Applications Ser. Nos. 60/189,575 and 60/189,576, both filed Mar. 15, 2000.

BACKGROUND

This invention relates generally to a method and apparatus for cooling articles, and more specifically to vaporizing a liquid a cryogen in a chamber and then circulating the vaporized cryogen through cooling circuits in a tool for cooling the tool itself or, such as where the tool is a calibrator, to cool an extrusion passed through the calibrator. Additionally, the tool itself may be disposed in a cooling chamber in which vaporized cryogen is circulated. The invention is particularly useful as an extrusion chiller. Additionally, many other applications of the invention will become apparent to those skilled in the art upon a review of the following specification and drawings.

Historically, water has been utilized as the primary medium for cooling articles, including extrusions. For example, conventional extrusion chilling systems employ a "cooling" chamber downstream from the extruder. The extrusion is fed through the cooling chamber, wherein the extrusion can be sprayed with water, or partially/fully submerged in water in order to chill the extrusion. Various other components may also be included in such systems, such as a vacuum sizing chamber intermediate the extruder and the cooling chamber. The vacuum sizing chamber can be used for hollow extrusions and employs a vacuum to assist the extrusion in maintaining its shape while it cools. Water can also be used in the vacuum chamber to cool the extrusion while the vacuum supports the shape.

Coolant mediums other than water which have been used in cooling processes can be referred to collectively as refrigerants, including cryogens. Cryogens include liquid nitrogen, liquid carbon dioxide, liquid air and other refrigerants having normal boiling points substantially below minus 50° F. (−46° C.). Prior art methods of cooling articles using cryogens disclose the benefits of fully vaporizing the cryogen into a gaseous refrigerant prior to contact with the articles to be cooled. Cryogens due to their extremely low boiling point, naturally and virtually instantaneously expand into gaseous form when dispersed into the air. This results in a radical consumption of heat. The resilient temperature can be reduced to hundreds of degrees below zero (Fahrenheit) in a relatively short time. However, prior methods of cooling fail to realize the advantages, both in increased efficiency and in improved system control, that can be achieved according to the invention by utilizing forced air convection in combination with the nitrogen or any other refrigerant. Some disadvantages of prior art cryogenic cooling systems include lower efficiency and limited options for controlling the cooling process. Such systems generally rely exclusively on the cooling effect of the refrigerant, to lower the ambient temperature and chill the article. Although prior art methods utilize forced convection to ensure complete vaporization of the cryogen, no methods use forced air convection to control the rate of cooling of the article by controlling the wind chill temperature. Consequently, the only control variable in the prior art methods to adjust (lower) the temperature is the introduction of liquid cryogen into the system. In contrast, the utilization of forced air convection adds a wide range of variable control to adjust the effective temperature, up or down, by controlling the velocity at which the refrigerant, is circulated over/around the article to be cooled.

The basis of forced air convection is the principle that blowing a refrigerant over a heated surface greatly enhances the transfer of heat from that surface. In the context of cold temperatures, this principle is probably better known indirectly, from the commonly used phrase "wind chill" temperature, which is frequently reported on TV or radio by weather announcers. In that context, wind chill temperature is what the temperature outside "feels" like, taking into account the ambient temperature and the prevailing velocity of the wind. The stronger (higher velocity) the wind, the lower the temperature "feels," compared to if there were no wind present. This principle is advantageously utilized according to the invention to significantly enhance the cooling efficiency of the system by creating, and controlling, "wind chill" temperature during the cooling process. As a result, the efficiency of the process can be increased while simultaneously reducing the size, which is typically the length, of the cooling system.

Another type of prior art cooling system utilizes a device called a "calibrator," and typically multiple such calibrators, to cool extrusions. A calibrator is a tool which generally has a central opening through which the extrusion is fed, the central opening having a surface which is generally in contact with the surface of the extrusion as it is fed therethrough. As a result of contact with the surface of the extrusion, heat is conducted to the calibrator away from the extrusion thus cooling the extrusion. To enhance the heat transfer from the extrusion, cooling circuits, internal passages, are provided in the calibrator through which a coolant is circulated. Typically, the coolant is water, but liquid nitrogen is also known to have been used to some degree. However, circulating liquid nitrogen through the cooling circuits has met with some difficulties regarding contact of the liquid nitrogen with the calibrators. Moreover, it has been found that it is preferable to first vaporize a liquid cryogen, such as liquid nitrogen, and then to circulate the super cold vapor/refrigerant through the cooling circuits instead of the liquid cryogen, which thus requires a system for vaporizing the liquid cryogen prior to circulation through the cooling circuits of the calibrator.

Accordingly, there is a need for a method and apparatus for cooling articles which can provide improved efficiency and can also reduce the size of the cooling system, and also an alternative cooling system for circulating vaporized cryogen through cooling circuits in calibrators.

SUMMARY

A method and apparatus for cooling articles is provided which can utilize the dispersion of a liquid cryogen into a chamber wherein the liquid cryogen is substantially vaporized and then circulated through either a separate cooling chamber, containing the article to be cooled, or through internal cooling circuits in a tool, such as a calibrator, to cool the article. The vaporized cryogen can be further circulated though a cooling chamber in which the tool is disposed. The vaporized cryogen can be circulated at a controllable velocity, over/around the tool and the article to be cooled, in order to regulate the rate of cooling by controlling the wind chill temperature, based upon the principles of forced air convection.

A presently preferred cryogen is liquid nitrogen. The liquid nitrogen can be dispersed into a feed chamber in a controlled manner using an valve, which itself can be operated by a controller, such as a microprocessor. Since the temperature in the feed chamber is much higher than the boiling point of the liquid nitrogen, a high BTU (British Thermal Unit) and expansion rate is captured thereby producing an extremely effective refrigerant. The feed chamber can be communicated with a cooling chamber into which the vaporized cryogen can be circulated by a fan, or other device for circulating air and/or vaporized cryogen. Either the feed chamber or the cooling chamber can be vented to dissipate pressure generated as the liquid nitrogen rapidly expands to gaseous form. The fan can preferably be a variable speed fan, or other variable speed device for circulating the vaporized cryogen through the cooling chamber at a controllable velocity to take advantage of principles of forced air convection. The fan can be located in the feed chamber to aid in substantially vaporizing the liquid cryogen. However, considering the relatively high temperature utilized in the cooling chamber compared to the boiling point of the cryogen, even without the fan, the liquid cryogen will virtually completely and instantaneously vaporize as it is injected into the feed chamber. The fan can be operated by the controller which can regulate the speed of the fan to provide improved temperature control over the system by controlling the wind chill temperature in the cooling chamber. The system can also include a temperature sensor, connected to the controller, for monitoring the temperature in the cooling chamber, and to calculate the wind chill temperature. A heating device can be provided to increase the temperature in the cooling chamber, if needed. The speed of the fan can be controlled by the microprocessor to circulate the refrigerant at a high volume (CFM) to maximize the cooling efficiency, thereby minimizing cryogen consumption. Essentially, the rate of cooling of the article can be increased for a given amount of cryogen dispersed into the feed chamber by increasing the speed of the fan. Another way to express this concept is to say that the "effective temperature" in the chamber can be reduced by increasing the speed of the fan. The articles to be cooled can be delivered into the cooling chamber by means of a conveyor belt, or various other ways of feeding articles, for example pulling extrusions, through the cooling chambers.

Furthermore, the cooling system can employ a plurality of cooling chambers, preferably adjacent, each of which can be individually controlled by one or more controllers. The controllers can manage the speed of the fan and the nitrogen injection for each individual cooling chamber, thereby providing for maximum heat exchange rates for efficiency and effectiveness. Each cooling chamber can be equipped with its own temperature sensor, nitrogen injection valve to control the introduction of nitrogen into the cooling chamber, and variable speed fan for circulating refrigerant through the cooling chamber.

In general operation, the temperature sensor detects the temperature in the cooling chamber, or of the circulated refrigerant, and feeds the information to the controller. The controller can be programmed with a desired temperature to which the temperature inside the cooling chamber is to be regulated. The controller can also control the nitrogen injection valve and the speed of the fan to cause the temperature in the cooling chamber to correspond to the desired temperature. An equation for calculating the "effective temperature," i.e. wind chill temperature, from the speed of the fan and the ambient temperature in the cooling chamber can be programmed into the microprocessor. The speed of the fan can thus be regulated to increase or decrease the rate of cooling of the article, by adjusting the effective temperature in the cooling chamber, in order to maximize the efficiency of the cooling system. Principles of forced air convection can thus be utilized to increase cooling efficiency while minimizing the consumption of nitrogen. The fan additionally permits improved system control over the effective temperature in the cooling chamber.

In some embodiments, the cooling chamber may be provided with a diffuser positioned between the article to be cooled and the initial dispersion of refrigerant into the cooling chamber. The diffuser can have an "inlet" into which flow from the fan is channeled, such as by a duct. As the nitrogen is dispersed into an area in the diffuser and expands into a gaseous refrigerant, the fan circulates the refrigerant through the diffuser. The diffuser can aid in more equally distributing the refrigerant around all sides of the article. The diffuser can have multiple openings directing the refrigerant towards the middle of the cooling chamber where the article to be cooled is located. Accordingly, the diffuser can provide a more even distribution of the refrigerant around all sides of the article for more efficient and evenly distributed cooling.

Another embodiment of the invention is a cooling system which, while not utilizing wind chill temperatures, is particularly adapted to vaporize a liquid cryogen and circulate the vapor/refrigerant through internal cooling circuits, commonly provided in metal tools for cooling either the tool itself or an article within the tool. A specific example of such a tool is a calibrator, which is commonly used to cool extruded articles. An additional embodiment of the invention can be a combination of a calibrator based cooling system and a cooling chamber based system wherein the calibrators are enclosed within the cooling chamber, or chambers. In the combined system, the calibrators, through which an extrusion is passed to be cooled, is itself, along with the extrusion, cooled within a cooling chamber.

Other details, objects, and advantages of the invention will become apparent from the following detailed description and the accompanying drawings figures of certain embodiments thereof.

BRIEF DESCRIPTION OF THE DRAWING FIGURES

A more complete understanding of the invention can be obtained by considering the following detailed description in conjunction with the accompanying drawings, in which:

FIGS. 4 and 5 are side views of an embodiment of a cryogenic cooling chamber showing the cover in open and closed positions, respectively.

DETAILED DESCRIPTION OF CERTAIN EMBODIMENTS

Figure 1:
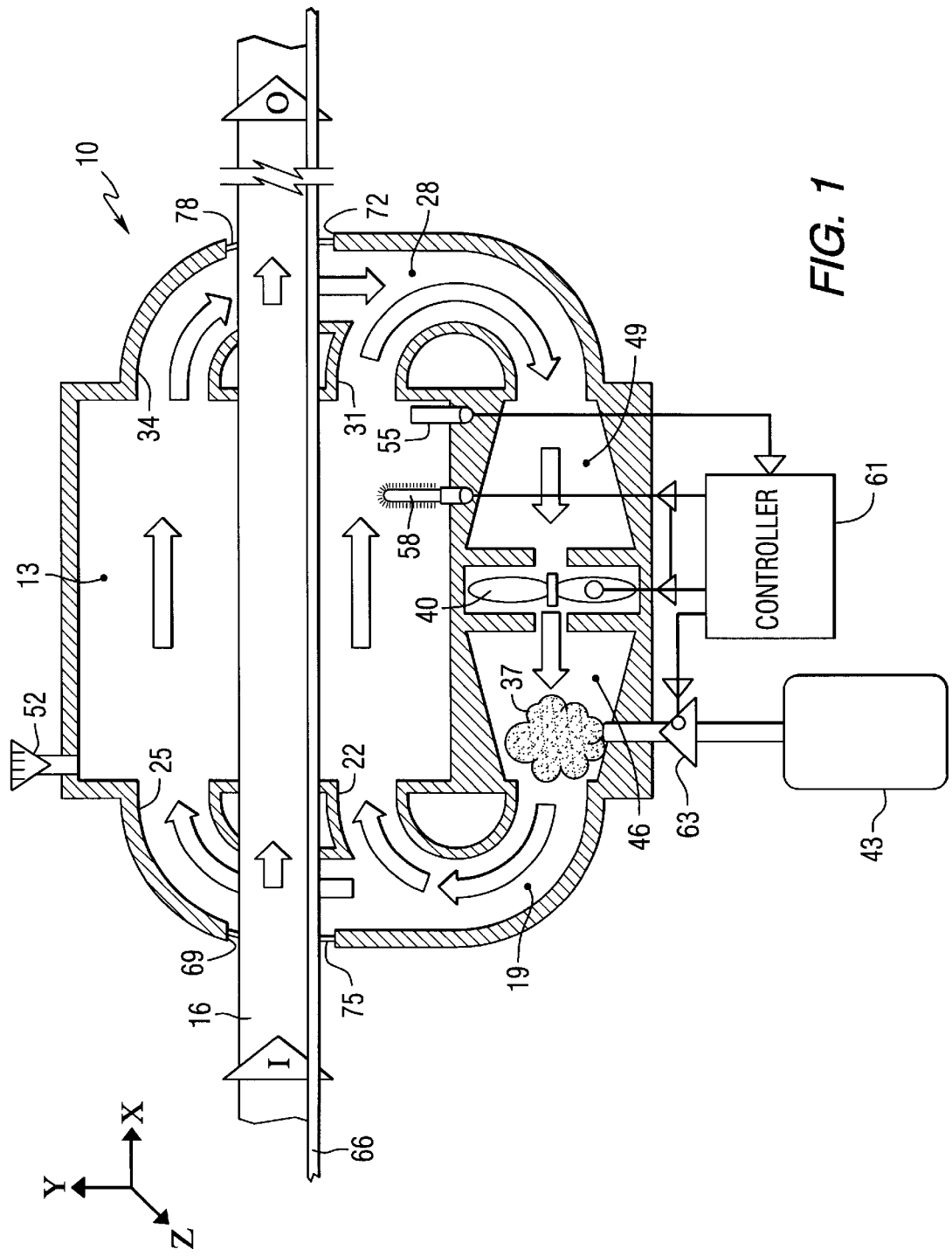
FIG. 1 is a cross sectional view of a basic schematic representation of a presently preferred embodiment of a cooling system.

A simplified representation of a cooling system 10 according to a presently preferred embodiment of the invention is illustrated in FIG. 1. The cooling system 10 shown has a feed chamber 46 connected a central cooling chamber 13 through which an article 16 can be passed so that the article 16 may be cooled to a desired temperature. Inlet passages 12, 22, 25 and outlet passages 28, 31, 34 can be channel to circulate refrigerant 37, preferably a vaporized cryogen such as liquid nitrogen, though the central cooling chamber 13 and back to a fan 40 which circulates the refrigerant 37 throughout the cooling system 10. Although not shown, it should be understood that the "fan 40" can be some other means for circulating air/vaporized cryogen. For example, a remotely located fan, or even a source of pressurized air, can be used to blow air into the feed chamber. In the cooling system 10 shown, two intake passages 22, 25 branch off from a main intake passage 19 into the central cooling chamber 13. Similarly, two return passages 31, 34 feed into a main return passage 28. The intake 19–25 and return 28–34 passages are provided at spaced locations on either side of the central cooling chamber 13 to more evenly distribute the refrigerant 37 around the article 16 to be cooled. The fan 40 is preferably controllable at variable speeds. Preferably, the cooling system 10 is generally captive, i.e., closed, such that generally no outside air enters and the refrigerant 37 is recirculated. The liquid cryogen, for example liquid nitrogen, can be injected into the feed chamber 46 which is separated from the cooling chamber 13, wherein the liquid nitrogen expands instantly into a gaseous form, e.g., refrigerant 37, upon entry into the air in the feed chamber 46 adjacent the fan 40. The fan 40 can also be operated to aid in complete vaporization of the liquid cryogen, although at the typical operating temperature of the system, for example −150 degrees F., the liquid cryogen essentially totally vaporizes instantly as it is injected. The feed chamber 46 can be provided adjacent the fan 40 and can be generally separated from the central cooling chamber 13 except for communication provided therebetween by intake passages 19, 22, 25. The intake passages 19, 22, 25 channel the refrigerant 37, circulated by the fan 40, from the feed chamber 46 into the central cooling chamber 13 after the liquid cryogen has been substantially vaporized in the feed chamber 46. The liquid cryogen can be injected into the feed chamber 46 generally adjacent the fan 40, into the stream of air/recirculated refrigerant 37, which aid in substantially vaporizing the liquid cryogen in the feed chamber 37 before it is circulated into the central cooling chamber 13 where the article 16 to be cooled is disposed. At the presently preferred operating temperatures of the system, substantially complete and instantaneous vaporization of the liquid cryogen occurs upon injection into the feed chamber 46. However, there may be alternative applications wherein a much lower operating temperature may be utilized, such that there is a greater probability of the liquid cryogen not totally vaporizing. In such applications, the separate feed chamber 46, in combination with the fan 40, can provide a region wherein substantially complete vaporization of the liquid cryogen 43 is provided, thereby reducing the likelihood of any liquid cryogen being distributed onto the surface of the article 16. The liquid cryogen is preferably liquid nitrogen, however, other cryogens such as liquid carbon dioxide, liquid air and other refrigerants having normal boiling points substantially below minus 50° F. (−46° C.) can also be used. The liquid nitrogen expands 700 times its volume in liquid state, capturing a high BTU as it transitions to gaseous form creating a highly effective refrigerant and rapidly reducing the temperature in the cooling system 10. The fan 40 can be controlled to circulate the refrigerant 37 at a variable velocity from the feed chamber 46, into the central cooling chamber 13 where it cools the article 16. In particular, the refrigerant 37 can be circulated by the fan 40 through the intake passages 19, 22, 25, into the central cooling chamber 13, out the return passages 28, 31, 34, and to a return chamber 49 behind the fan 40. From the return chamber 46, the refrigerant 37 is circulated by the fan 40 back through the feed chamber 49, where it can be further cooled by the injection of additional liquid nitrogen 43, if required, by a valve 63 which is regulated by a controller 61. From the feed chamber 46, the refrigerant 37 is recirculated through the intake passages 19, 22, 25 back into the central cooling chamber 13. This process can be repeated as the refrigerant 37 is continuously circulated through the cooling system 10 to cool the article 16. The fan 40 can be regulated by the controller 61 to circulate the refrigerant 37 at variable speeds according to the level of cooling desired. The cooling process continues, including the injection of additional refrigerant 37 into the feed chamber 46 as needed to obtain, or maintain, a desired temperature in the central cooling chamber 13.

The cooling system 10 can further include a number of other components for controlling, optimizing, and generally automating the cooling process. These other components can include a vent 52, a temperature sensor 55, and a heating unit 58. The controller 61 can include a microprocessor, for controlling the operation of the cooling system 10, either automatically or under the control of an operator. The vent 52 can be provided, for example in the central cooling chamber 13 as shown, to release pressure build up which may be created by the expansion of the liquid nitrogen as it is injected into the feed chamber 46. The vent can simply be a small orifice. The temperature sensor 55 can be provided in communication with the central cooling chamber 13 to monitor temperature in the chamber 13. Alternatively, the temperature sensor could be positioned elsewhere, such as the feed chamber 46 or in the main intake passage 19 in order to detect the temperature of the refrigerant 37 coming into the chamber 13. Similarly, additional temperature sensors could be positioned to detect the temperature of the refrigerant 37 in the return chamber 49 or main return passage 28. Output from the temperature sensor 55, and other sensors, if more are used, can be provided to the controller 61 for use in regulating the speed of the fan 40 and controlling the valve 63 to inject liquid cryogen 43 into the feed chamber 46. The temperature sensor 55 can be, for example, a thermocouple. The controller 61 can be programmed with the wind chill equation and can also receive a signal from the fan 40 indicative of the fan speed. This data can be used to determine the effective temperature in the central cooling chamber 13. The heating unit 58, can be a simple heating element and can be located, for example, in the central cooling chamber 13, as shown in the figure. The heating element can be operated by the controller to increase the temperature in the cooling system 10, if necessary, to adjust and maintain the desired ambient temperature.

The controller 61 can control the speed of the fan 40, inject the valve 63 to the refrigerant 37 and the feed chamber 46 and the heating unit 58, closely regulate the wind chill temperature in the central cooling chamber 13 to correspond to, and be maintained to the desired wind chill temperature. The temperature, and/or wind chill temperature, desired to be provided in the cooling central chamber 13 can be input by an operator and the controller 61 can monitor the fan speed and feedback from the temperature sensor 55 in the central cooling chamber 13 to cause the sensed temperature, or calculated wind chill temperature, to correspond to the desired temperature. Additional temperature sensors, and feedback therefrom to the controller 61, could be utilized as described in U.S. patent application Ser. No. 09/450,383, which is hereby incorporated herein by reference.

The cooling efficiency of the system can generally be optimized by using principles of forced air convection—extraction of heat from an article 16 can be increased by blowing cooler air over a warm surface. The "effective" temperature inside the central cooling chamber 13 can be calculated from the ambient temperature and the velocity that the air (refrigerant 37) is blown over the surface of the article 16 using the following equation for calculating "wind chill" temperature:

$$T_{WC}=0.0817(3.71V^{0.5}+5.81-0.25\ V)(T-91.4)+91.4$$

More specifically, the efficiency of the cooling system 10 can be optimized, i.e., maximum cooling using a minimum amount of liquid cryogen 43, by controlling the speed of the fan 40. In particular, for a given amount of liquid cryogen 43 injected into the feed chamber 46, the speed of the fan 40 can be increased in order to increase the rate in cooling of the central cooling chamber 13 without adding more liquid cryogen 43. Only when the speed of the fan 40 is at its maximum, would it be necessary to inject additional liquid cryogen 43 into the feed chamber 46 to further reduce the temperature in the central cooling chamber 13. Moreover, the temperature in the central cooling chamber 13 can also be regulated to a set point temperature by adjusting the speed of the fan 40, faster or slower, instead of injecting more liquid cryogen 43. In contrast, prior art cryogenic cooling systems typically control the temperature solely by controlling the amount of cryogen injected into the system 58. The efficiency of the system can be further optimized if it becomes necessary to increase the temperature in the cooling chamber by using the heating unit 58. Prior to expending energy to operate the heating unit, the speed of the fan 40 can be reduced to lower the wind chill temperature, and thus decrease the rate of cooling. If reducing the speed of the fan 40 alone is insufficient, then the heating unit 58 can be operated. By reducing the speed of the fan 40 first, energy can be conserved, thus increasing the efficiency of the cooling system 10. It should therefore be appreciated that "rate of cooling," is dependent both on the sensed temperature and the wind chill, i.e., "effective," temperature. To summarize, increasing the speed of the fan 40 results in lowering the effective temperature in the cooling chamber 13, which results in an increase in the rate of cooling of the article 16. Conversely, reducing the speed of the fan 40 results in an increase in the effective temperature in the cooling chamber 13 which results in a decrease in the rate of cooling of the article 16. Accordingly, it can be appreciated that controlling the speed of the fan 40 can be advantageously utilized to control the "effective" temperature in the cooling chamber 13, and thus the rate of cooling of the article 16.

The article 16 can be feed through the central cooling chamber 13 using, for example, a conveyor belt 66, which passes through openings 69, 72 that can be provided on generally opposing sides of the cooling chamber 13. Appropriate seals 75, 78 can be used to prevent leakage of refrigerant 37 from the central cooling chamber 13. Additionally, the seals could be designed to permit excess pressure in the system to vent outside the cooling chamber. In such case, a separate vent may not be needed. In any event, seals 75, 78 can be used to maintain the cooling chamber as a generally closed captive system.

Figure 2:
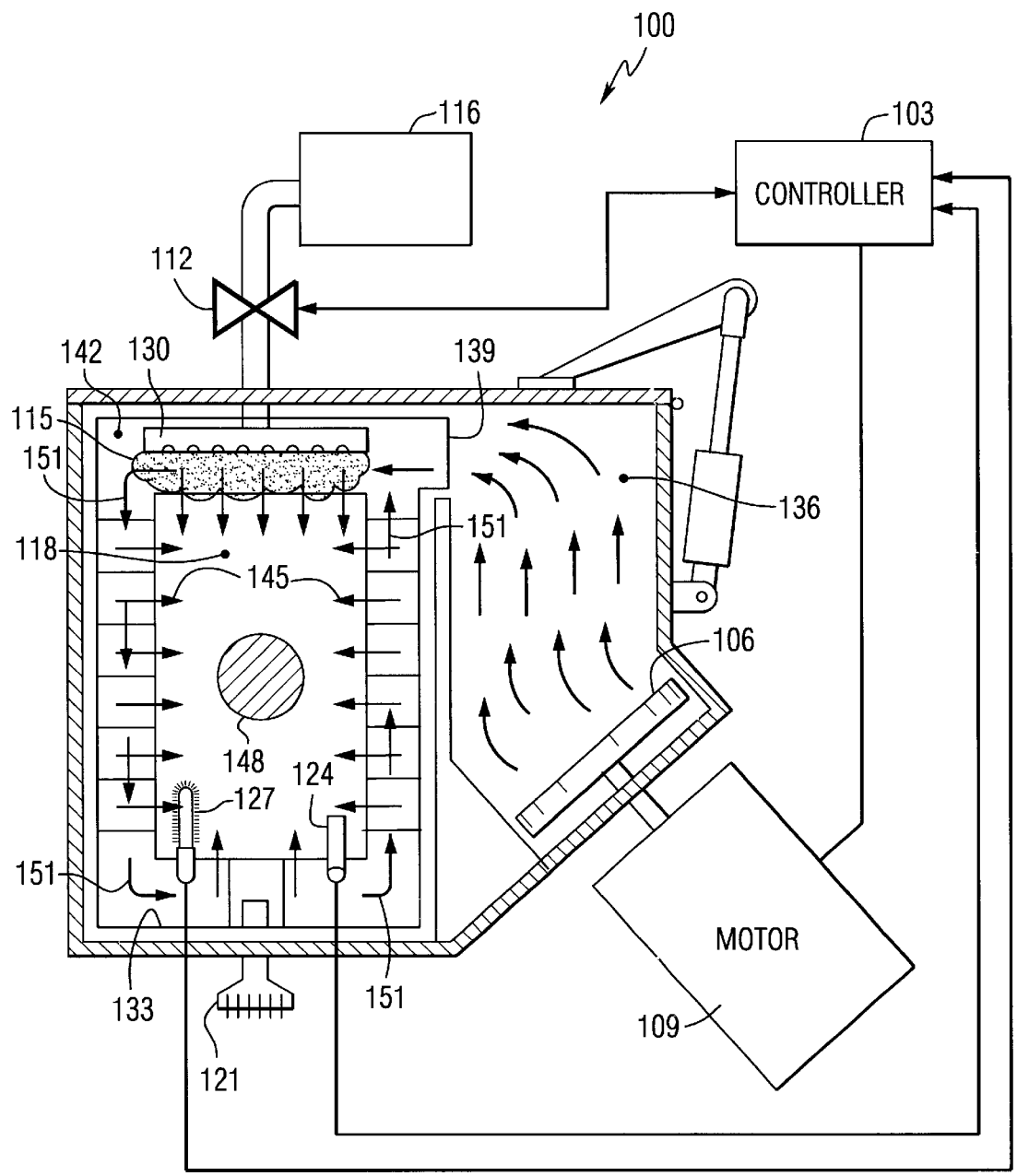
FIG. 2 is a cross sectional view similar to the view in FIG. 1, except rotated 90° about the Y-axis, of another presently preferred embodiment of a cryogenic cooling chamber.

Another preferred embodiment of a cooling system 100 is illustrated in the cross sectional view shown in FIG. 2. This cross sectional view however, is rotated 90° about the Y-axis compared to the view in FIG. 1. The embodiment shown can generally include the same main components as the cooling system 10 illustrated in FIG. 1. For example, a microprocessor/controller can control a fan 106 driven by a motor 109, and a valve 112 which injects a refrigerant 115 into the central cooling chamber 118. A source of refrigerant 116, which presently is preferred liquid nitrogen, can be connected to the valve 112. A vent 121 can also be provided for releasing any pressure build-up. A temperature sensor 124 can be provided to monitor ambient temperature in the central cooling chamber 118 and output that information to the controller 103. A heating unit 127 can also be provided under the control of the controller 103 for upwardly adjusting the temperature inside the central cooling chamber 118 if necessary. However, a couple of additional elements illustrated in FIG. 2 are a spray bar 103 for dispersing the refrigerant 15 and a diffuser 113 disposed within the control chamber 118 for controlling the dispersion of the refrigerant 115 into the central cooling chamber 118. A side chamber 136 can be provided adjacent the control cooling chamber 118 to somewhat isolate the fan 108 from the central cooling chamber 118 in this circumstance. The side chamber can also be configured to direct air flow produced by the fan 106 into an intake portion 139 of the diffuser 133. The spray bar injects refrigerant 15 into a region 142 at the top of the diffuser 133 adjacent to where air from the fan 106 is directed into the intake portion 139 of diffuser 133. The fan 40 aids in generally complete vaporization of the liquid nitrogen when injected into region 142. Multiple openings in the diffuser 133, indicated by the inwardly pointing arrows, encircling the extrudate in the middle of the central cooling chamber, direct the refrigerant around all sides of the articles 148, e.g. extrudate, for more evenly applied cooling. As shown by the arrows 151 indicating flow in a circular direction or within the diffuser 133, is directed through the inlet of the diffuser into the region where the liquid nitrogen is dispersed from the spray bar 130. From there, the refrigerant 115 is channeled through the diffuser 133, as shown by arrows 151, and directed radially inward towards the extrudate, which is positioned generally in the middle of the central cooling chamber 118 through the multiple opening in the diffuser 133 indicated by arrows 145. In other respects, such as the control over the process, the operation of the cooling system 100 in FIG. 2 can generally be the same as that described in connection with the operation of the cooling system 10 illustrated in FIG. 1.

Figure 3:
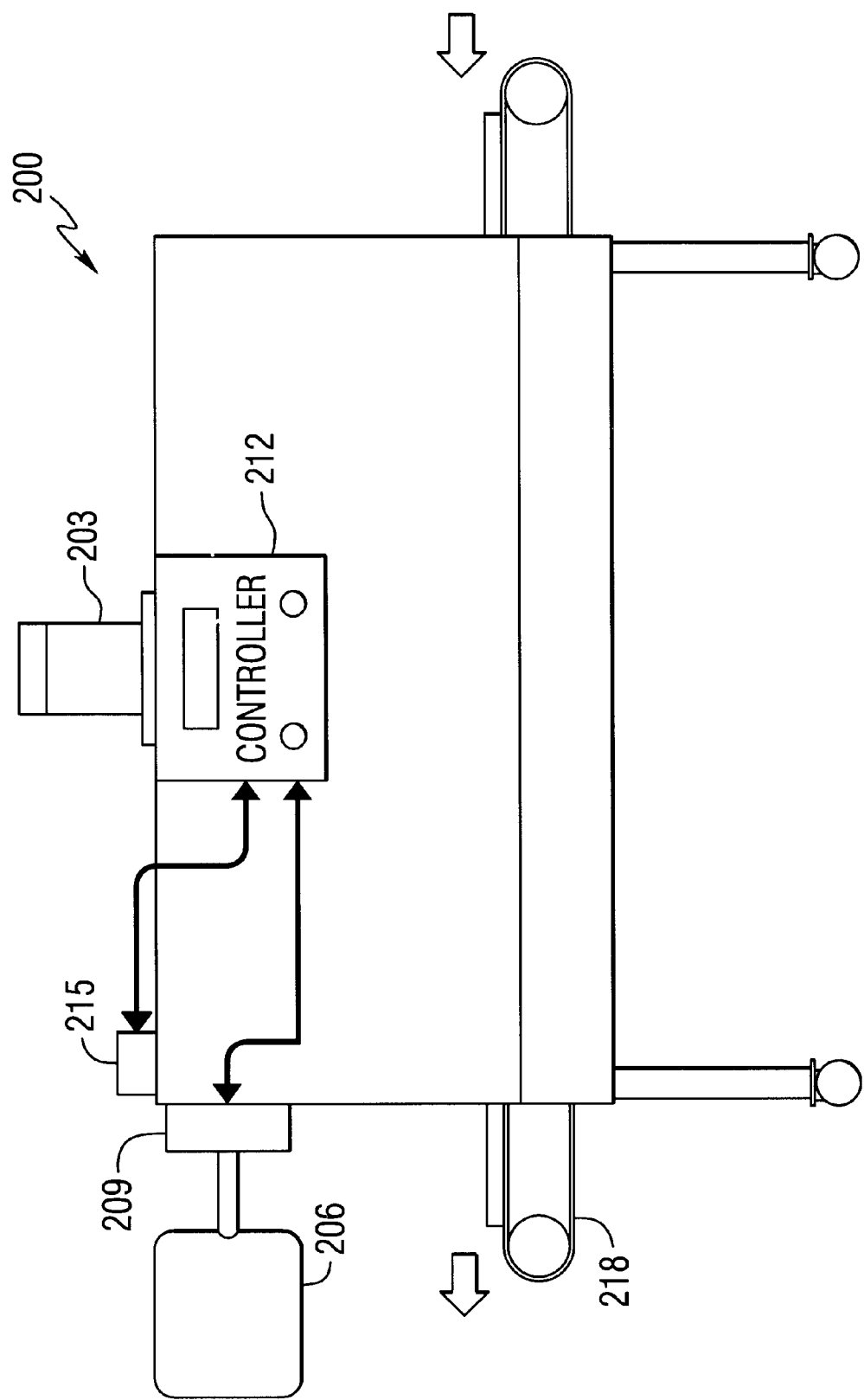
FIG. 3 is a side view of an embodiment of a cryogenic cooling chamber.

A side view of another embodiment of a cooling system 200 is illustrated in FIG. 3. In this embodiment, the fan 203 and refrigerant source 206 and valve 209 are positioned above the central cooling chamber rather than below it as shown in FIG. 1. However, the components of the cooling system 200 can also be generally the same as for the cooling systems 10, 100 illustrated in FIGS. 1 and 2. In particular, the source of refrigerant 206 can preferably be liquid, the injection of which into the cooling chamber can be controlled by the valve 209, which itself can be operated by a controller 212. A temperature sensor 215 can be provided for detecting the ambient temperature in the cooling chamber and outputting that information to the controller 212. A conveyor system 218 can similarly be used to feed articles to be cooled through the central cooling chamber. Likewise, the controller 212 can regulate the temperature in the cooling chamber by controlling the fan 203 and the valve 209 based upon feedback from the temperature sensor 215.

FIGS. 4 and 5 are side views showing the top cover 253 of an embodiment of a cooling system 250 in closed and opened positions, respectively. Similarly to FIG. 1, this embodiment of the cooling system can utilize a lower mounted fan 256, valve 259 and refrigerant source/inlet 262. An opening 265 with appropriate sealing portions 268 are also illustrated, through which articles to be cooled can be transported, such as by a conveyor system, through the central cooling chamber. The opening and closing of the top cover 253 can be controlled by a mechanism 271 such as a spring, pneumatic, hydraulic member, or other member, as generally illustrated.

Figure 6:
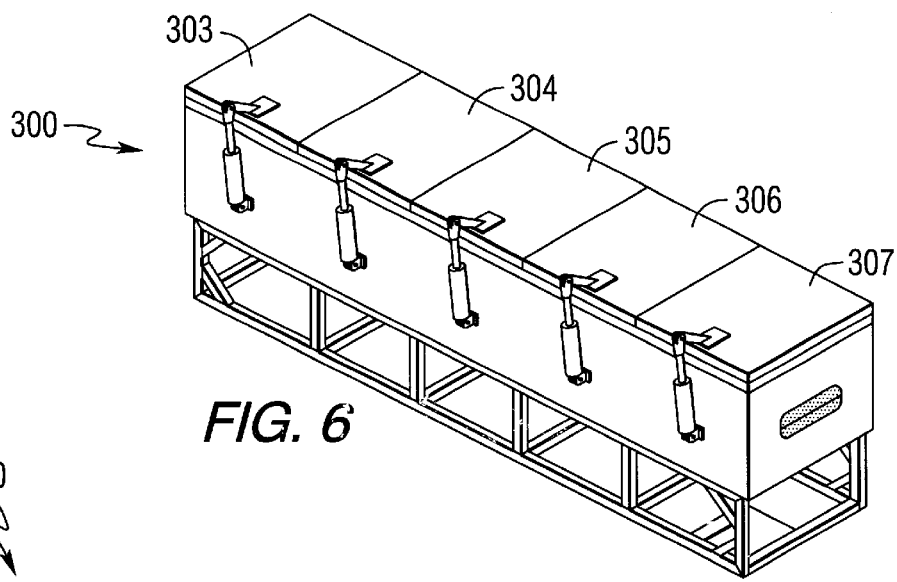
FIG. 6 is a rear perspective view of an embodiment of the invention having multiple cooling chambers.
Figure 7:
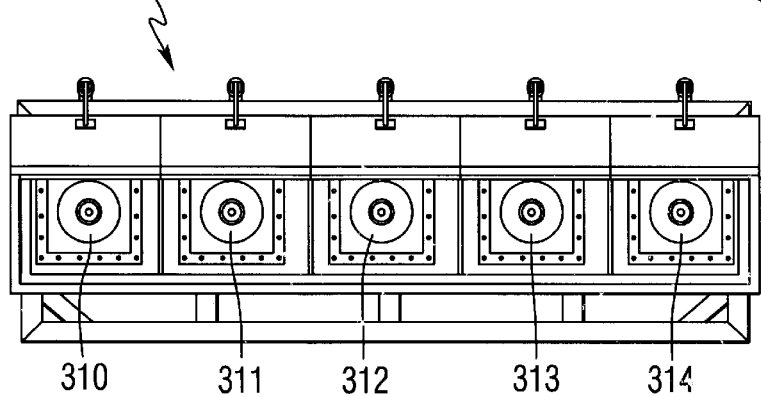
FIG. 7 is a bottom plan view of the embodiment shown in FIG. 6.
Figure 8:
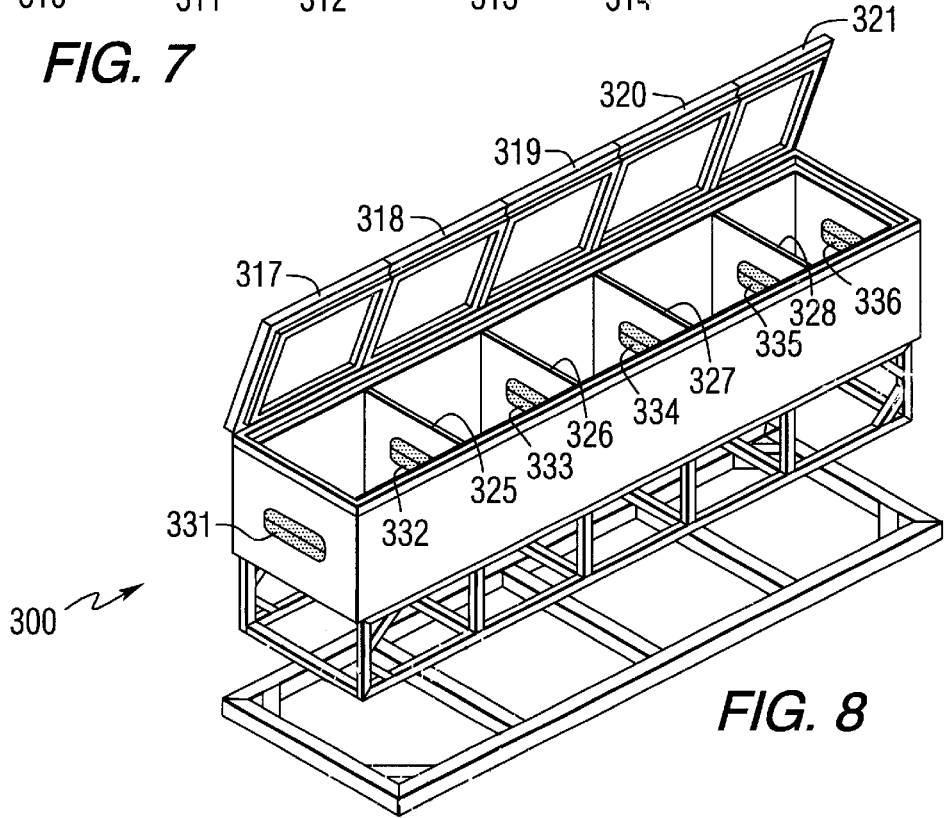
FIG. 8 is a front perspective view of the embodiment shown in FIG. 6.

An additional embodiment a cooling system 300 can be configured with several independently controlled sections 303–307, or cooling "zones," as illustrated in FIGS. 6–8. A rear perspective view of the cooling system 300 is illustrated in FIG. 6. FIG. 7 is a bottom view thereof, generally showing how each individual zone 303–307 can have individual provisions 310–314 to connect a refrigerant, valves and fans (none shown in these views) for each section 303–307. This can permit a single controller (not shown), or multiple individual controllers, to individually control the temperature in each of the separate sections 303–307, or cooling zones. As illustrated in the front perspective view in FIG. 8, with each of the top covers 317–321 in the open position, the individual cooling zones can also have interior partitions 325–328 which separate the inside of the cooling system 300 into individual sections 300–307 for controlling the temperature separately in each section. Openings 331–336 can similarly be provided through each section 303–307 for transporting articles to be cooled through each section 303–307. FIGS. 6–8 it should be understood, merely illustrate that certain embodiments of a cooling system according to the invention may be configured with multiple individually controllable sections for regulating the temperature in each section 303–307, or cooling zone, independently of other sections. Additionally, although shown directly adjacent to each other, it should also be realized that rather than being divided portions of one generally integral cooling system 300, each section 303–307, could alternatively be spaced apart, detached units. In other respects, the particular configuration of, and components of, the cooling system 300, or each section 303–307 thereof, can generally be as illustrated in FIGS. 1, and/or 2. These components can include the refrigerant source, valve, controller, fan, temperature sensors, heating unit, vent, diffuser and other components illustrated and described previously.

It also should be understood that the configuration and number of passageways provided to circulate the air through the cryogenic cooling system, and around the article to be cooled, can be varied to suit different applications and conditions. Consequently, the embodiments illustrated are by way of example only, and are in no way intended to be an exhaustive representation of every possible configuration.

Figure 9:
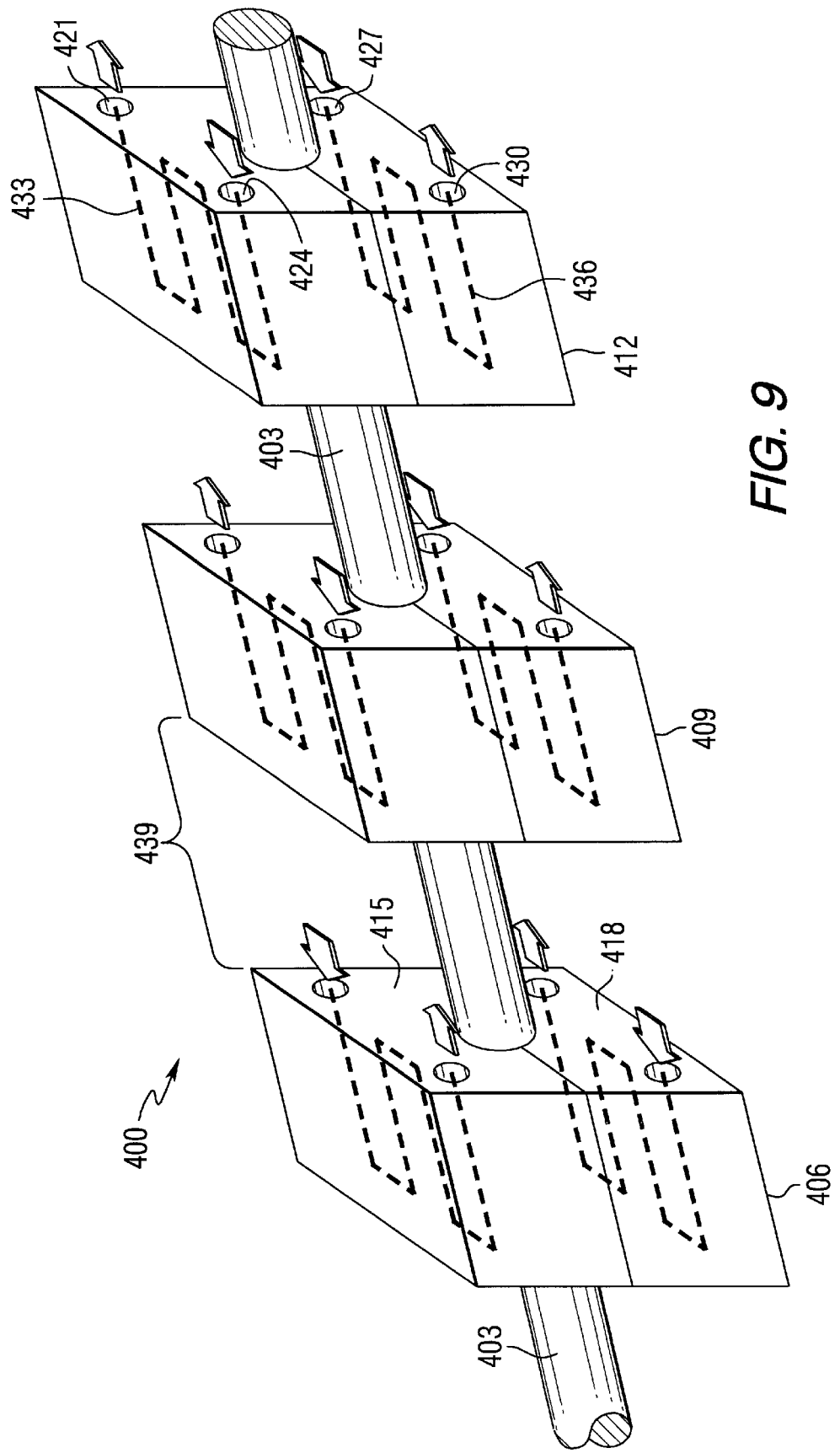
FIG. 9 is a perspective view of an alternative type of cooling system using calibrators to cool and extrusion.

Instead of cooling the outside of an article, vaporized cryogen can also be used to cool tooling, or articles held therein, by circulating the vaporized cryogen through internal cooling passageways, e.g. cooling circuits, provided in the tooling. One example applicable to cooling extrusions are tools called calibrators. A prior art type calibrator based cooling system 400 is shown in FIG. 9, and can typically utilize multiple calibrators 406, 409, 412 positioned at spaced apart locations through which cool an extrusion 403 is fed and thereby cooled. However, other tools, just one example being steel molds used in injection molding operations, also are commonly provided with internal cooling circuits through which vaporized cryogen can likewise be circulated.

Figure 10:
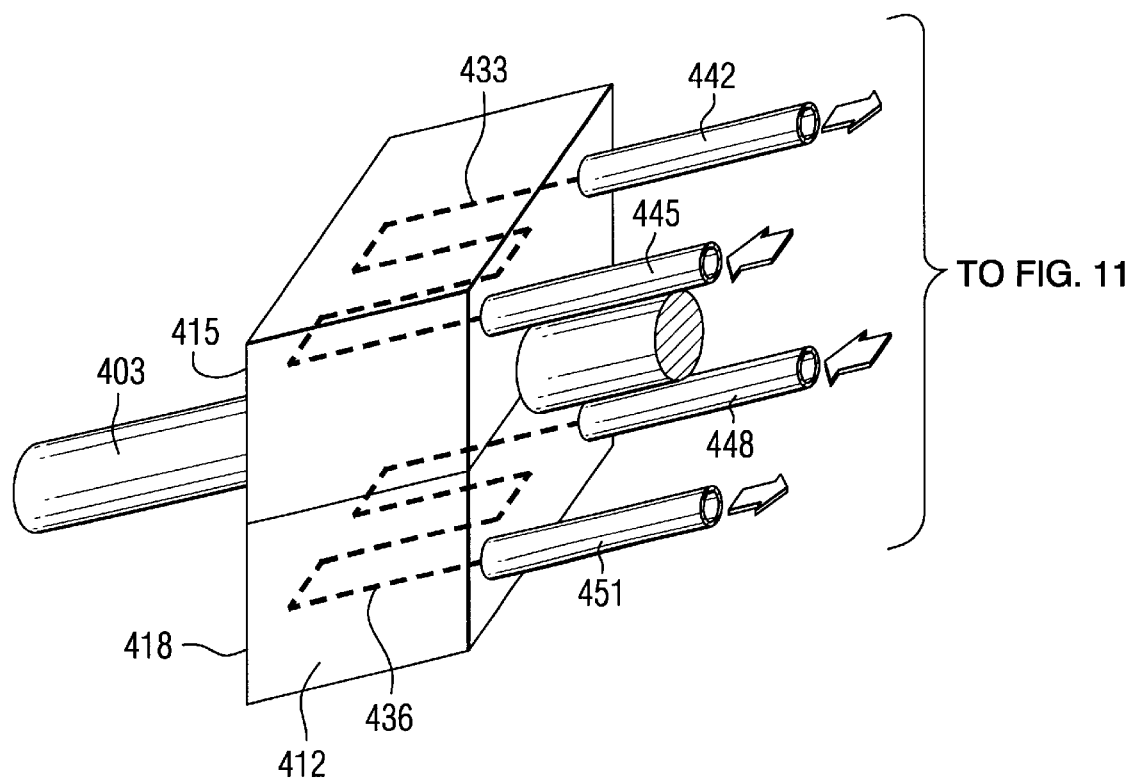
FIG. 10 is a perspective view of a presently preferred embodiment of a calibrator for cooling an extrusion.

Referring now to FIG. 10, each calibrator 406, 409, 412 can have an upper 415 section and a lower 418 section, which permits the calibrator to be opened and fixed in place around the extrusion 403. In order to effect cooling of the extrusion 403, each calibrator 406, 409, 412 can be provided with internal cooling passages 433, 436, as shown with regard to calibrator 412. Inlet 424, 427 openings and outlet 421, 430 openings for each cooling circuit 433, 436 can be provided for circulating a coolant, such as a vaporized cryogen, through the cooling circuits 433, 436 in order to lower the temperature of the calibrator 406, 409, 412 and effect cooling of the extrusion 403 as it is passed through each calibrator 406, 409, 412. Each cooling circuit 433, 436 can be appropriately plumbed, such as by conduits 442, 445, 448, 451, to circulate the refrigerant through each of the cooling circuits 433, 436.

Figure 11:
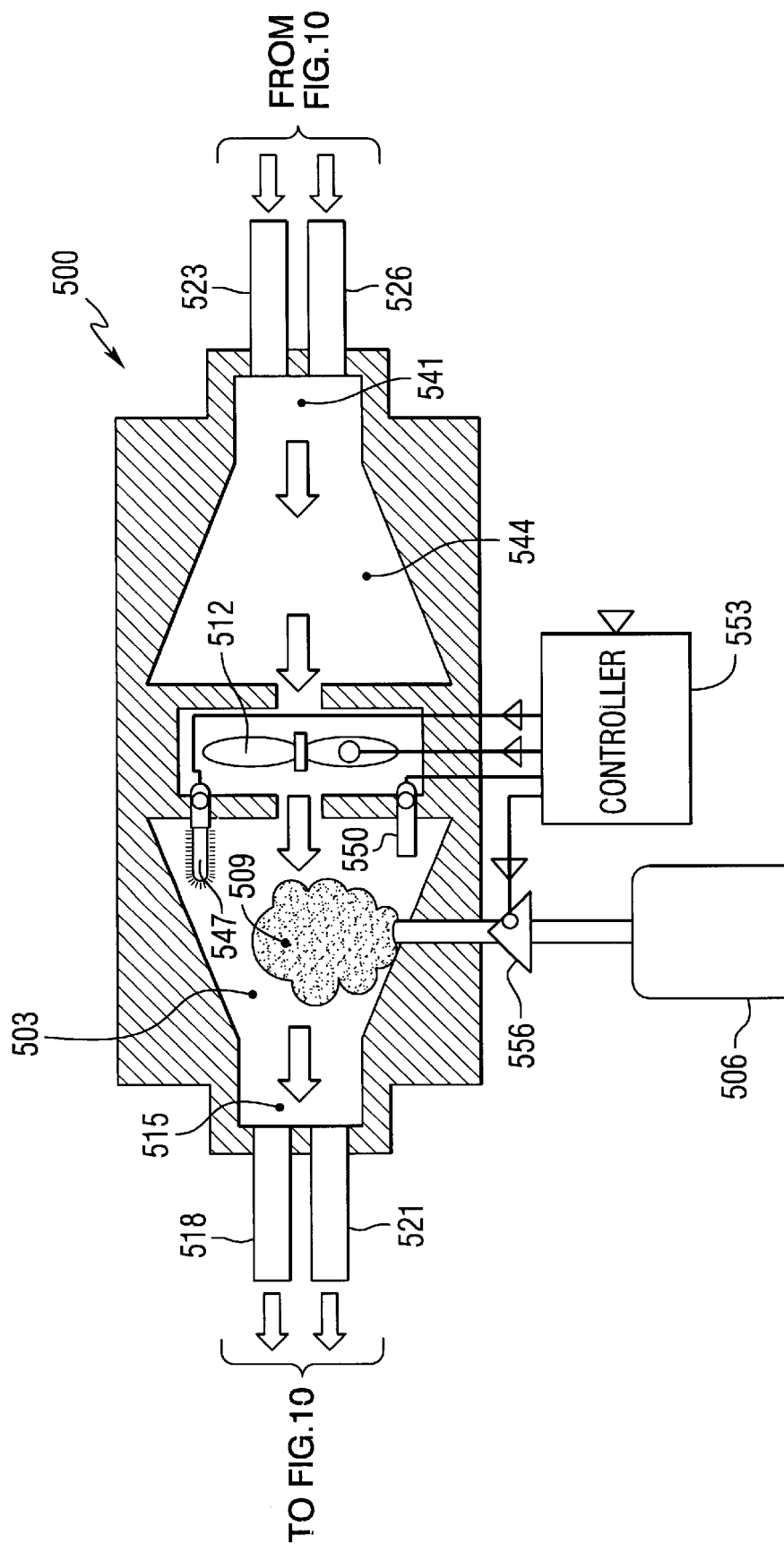
FIG. 11 is a presently preferred embodiment of a cooling system for use with a calibrator as shown in FIG. 10 to cool an extrusion.

Referring to FIG. 11, a cooling system 500, configured similarly to the cooling system 10 shown in FIG. 1, can be used as the source of coolant to be circulated through the calibrators 406, 409, 412. The cooling system 500 can be very much like the cooling system 10 with exception that the cooling system 500 can be designed to circulate vaporized cryogen through the cooling circuits 433, 436 in the calibrators 406, 409, 412 instead of through a central cooling chamber. Otherwise, the cooling system 500 can similarly include a feed chamber 503 into which a liquid cryogen 506 is introduced and vaporized into a gaseous refrigerant 509. The refrigerant 509 can be circulated by a fan 512 through an intake passageway 515, which can channel the refrigerant 509 into a number of feed lines 518, 521. These feed lines 518, 521 can be equal in number to the number of inlet conduits 445, 448 provided to circulate the refrigerant 509 through the cooling circuits 433 and 436 of the calibrator 412, as shown in FIG. 10. The fan 512 circulates the refrigerant 509 from the feed chamber 503 through the intake passage 515 and the feedlines 518, 521 through cooling circuit 433, 436 inlet passages 445 and 448. The refrigerant 509 is thus circulated through the cooling circuits 443, 436 and out of the calibrator 412 through outlet passages 442, 451. As shown in FIG. 11, the refrigerant 509 is from there circulated via return lines 523, 526 to a return inlet 541 and a return chamber 544 behind the fan 512. From return chamber 544, the fan 512 can recirculate the refrigerant 509 through the system, re-cooling it if necessary by injecting additional liquid cryogen 506 into the feed chamber 503. A controller 553 can receive temperature information from a temperature sensor 550 in the feed chamber 503. The controller 553 can utilize the information from the temperature sensor 550 to control the temperature of the refrigerant 503 by controlling a valve 556 which regulates the injection of liquid cryogen 506 into the feed chamber 503. In this manner the controller 553 can control cooling of the extrusion 403 as it is fed through the calibrators 406, 409, 412. A heating element 547 can also be provided under the control of the controller 553 in order to increase the temperature of the refrigerant 509 in the feed chamber if necessary. In general, the cooling system 500 works in conjunction with the calibrator cooling system 400 by controlling the cooling of the extrusion 403 using feedback from the temperature sensor 550 to regulate the injection of liquid cryogen 506 into the feed chamber 503 to reduce the temperature of the refrigerant 409 and can increase the temperature of the refrigerant 509 by controlling the heating element 547. In most respects the cooling system 500 can operate in a similar manner to the cooling system 10 shown in FIG. 1. However, since the refrigerant is circulated through internal cooling circuits 433, 436 in the calibrators 406, 409, 412, the refrigerant is not contacting the surface of the extrusion, and thus forced air convection to control the wind chill temperature in a cooling chamber by blowing refrigerant over the extrusion is not applicable in the cooling system 500. Moreover, additional ways to control the cooling of the extrusion using calibrators based on temperature feedback can be as described in the aforementioned U.S. patent application Ser. No. 09/450,383.

Figure 12:
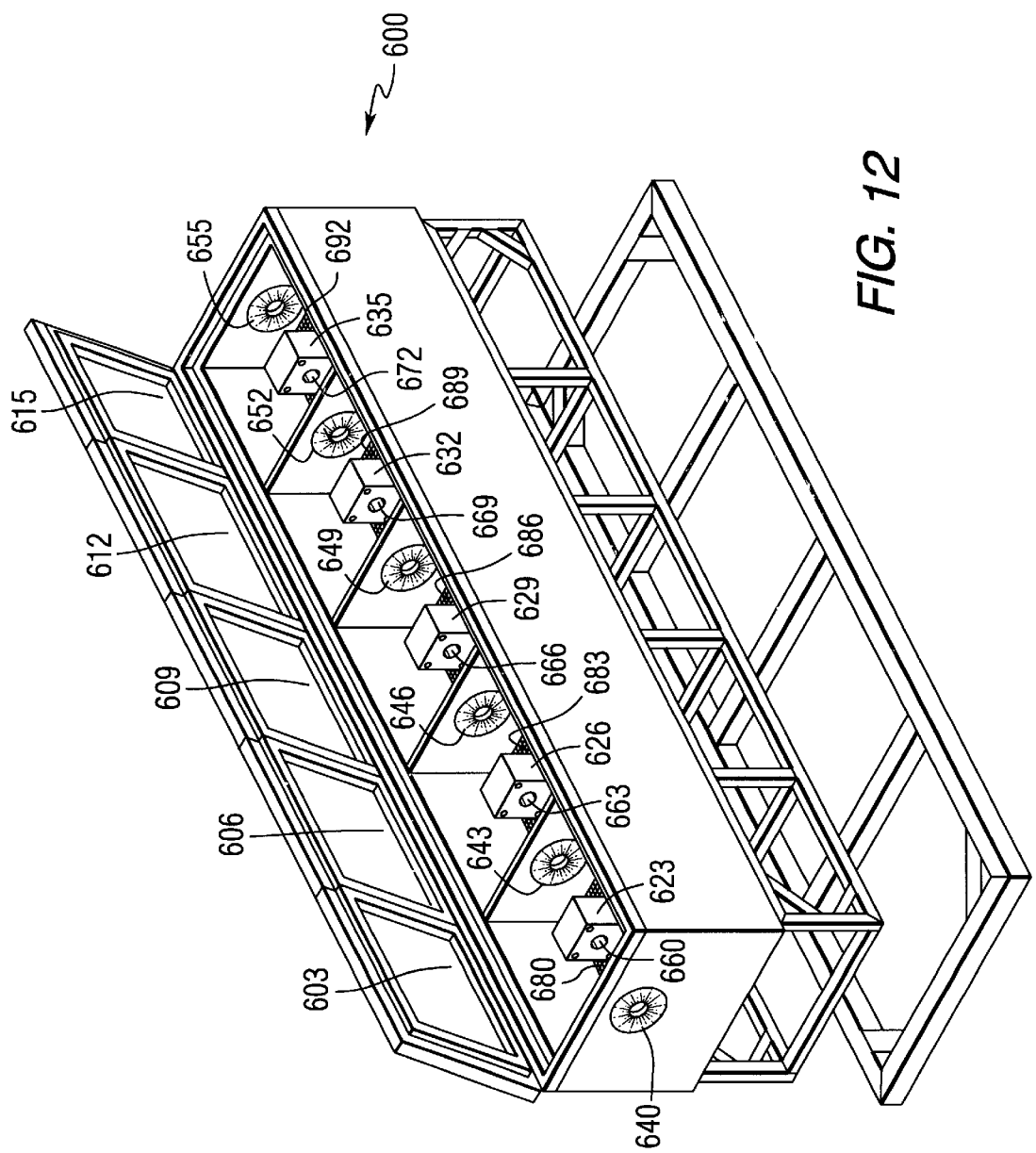
FIG. 12 is a presently preferred embodiment wherein a calibrator based cooling system is used in combination with a cooling chamber based cooling system.

A further embodiment of the invention can be a cooling system 600, shown in FIG. 12, which can essentially be a combination of a calibrator based cooling system, such as the cooling system 500 using calibrators 406–412, and a cooling chamber based system like the cooling system 10. The combination cooling system 600 can have a plurality of cooling chambers 603–615 in which are generally enclosed a plurality of calibrators 623–635. A base 680–692 can be provided in each cooling chamber 603–615 on which the calibrators 623–635 can be supported. The base 680–692 can be, for example, a screen which does not significantly block the circulation of vaporized coolant around the calibrators 623–635. Although one calibrator is shown in each cooling chamber, it should be understood that there can be more than one in each chamber. Conversely, a calibrator need not necessarily be provided in each and every cooling chamber. Each cooling chamber 603–615 can be provided with openings therethrough, such as openings 640–655, for feeding an extrusion therethrough to be cooled by the calibrators 623–635, and by the cooling chambers 603–615. Similarly, each calibrator 623–635 typically has center openings 660–672, which should be axially aligned with the openings 640–655 in the cooling chambers 603–615, through which an extrudate can be passed and cooled.

In regard to operation of the cooling chamber based portion of the cooling system 600, the components and the manner of operation thereof can be essentially the same as described for the cooling systems 10 and 100 described in connection with FIGS. 1 and 2. Likewise, the operation of the calibrator based portion of the cooling system 600, the calibrators 623–635 can be as described in connection with FIGS. 9–11, and as utilized in association with the cooling system 500 described in connection with FIG. 11 for circulating vaporized coolant through the internal cooling circuits of the calibrators in the described manner. In regard to the combined operation, each portion of the combined cooling system 600, i.e., the calibrator based portion and the cooling chamber based portion, can be controlled individually concerning the temperature of the vaporized cryogen circulated through the cooling circuits of the calibrators and within the central cooling chambers, respectively. The temperatures of each can likewise be regulated using feedback from individual temperature sensors unique to each of the different systems. Furthermore, additional temperature sensor feed back concerning the temperature of the calibrator within the cooling chamber can be provided to the cooling system based portion controller as additional feedback for use in controlling the temperature in one or all of the cooling chambers. It should also be understood, that a single controller, such as a microprocessor, could be utilized to perform the individual functions of both systems, although separately, and where appropriate, could also be utilized to perform a higher level, overall control of the combined system 600.

Moreover, although certain embodiments of the invention have been shown and described in detail, it should be appreciated by those skilled in the art that various modifications to those details could be developed in light of the overall teaching of the disclosure. Accordingly, the particular embodiments disclosed herein are intended to be illustrative only and not limiting to the scope of the invention which should be awarded the full breadth of the following claims and any and all embodiments thereof.

What is claimed is:

1. A method of cooling a tool or an article to be cooled in or by said tool, said method comprising:
   a. introducing liquid cryogen into a feed chamber wherein said liquid cryogen is substantially vaporized; and
   b. circulating said vaporized liquid cryogen from said feed chamber through internal cooling passages in at least one calibrator for cooling an article to be passed through said at least one calibrator.

2. The method of claim 1 further comprising:
   a. sensing at least one of a first temperature in said feed chamber and a second temperature of said at least one calibrator; and
   b. controlling said first temperature to generally correspond to a desired first temperature.

3. The method of claim 2 wherein controlling said first temperature comprises reducing said first temperature by injecting additional liquid cryogen into said feed chamber.

4. The method of claim 2 wherein controlling said first temperature comprises increasing said first temperature by heating said feed chamber.

5. The method of claim 2 wherein said controlling said first temperature is responsive to at least said second temperature to cause said second temperature to generally correspond to a desired second temperature.

6. The method of claim 1 further comprising:
   a. circulating said vaporized coolant back through said feed chamber; and
   b. introducing additional liquid cryogen into said feed chamber;
   c. recirculating said vaporized liquid cryogen to cause said temperature to generally correspond to a desired temperature.

7. A method of cooling an extrusion comprising:
   a. disposing at least one calibrator in a generally enclosed cooling chamber, said calibrator having at least one cooling circuit;
   b. feeding said extrusion through an opening provided through each of said cooling chamber and said at least one calibrator;
   c. circulating vaporized cryogen through said at least one cooling circuit in said at least one calibrator to cool said extrusion; and
   d. circulating said vaporized cryogen in said cooling chamber to cool at least one of said extrusion and said at least one calibrator.

8. The method of claim 7 further comprising:
   a. introducing liquid cryogen into a feed chamber wherein said liquid cryogen is substantially vaporized to form said vaporized cryogen; and
   b. circulating said vaporized cryogen from said feed chamber through at least one of said cooling chamber and said at least one cooling circuit.

9. The method of claim 8 further comprising circulating at least one of air and said vaporized cryogen in said feed chamber to substantially vaporize said liquid cryogen therein.

10. A method of cooling an extrusion comprising:
a. disposing at least one calibrator in a generally enclosed cooling chamber, said calibrator having at least one cooling circuit;
b. feeding said extrusion through an opening provided through each of said cooling chamber and said at least one calibrator;
c. circulating a coolant through said at least one cooling circuit in said at least one calibrator to cool said extrusion;
d. circulating vaporized cryogen in said cooling chamber to cool at least one of said extrusion and said at least one calibrator;
e. introducing liquid cryogen into a feed chamber wherein said liquid cryogen is substantially vaporized to form said vaporized cryogen;
f. providing fluid communication from said feed chamber to said cooling chamber;
g. said vaporized cryogen being circulated from said feed chamber into said cooling chamber;
h. circulating said vaporized cryogen at a controllable velocity from said feed chamber into said cooling chamber to create a wind chill temperature in said cooling chamber to increase a rate of cooling of said article;
i. sensing the temperature in at least one of said feed chamber and said cooling chamber;
j. calculating said wind chill temperature in said cooling chamber, said wind chill temperature being a function of the temperature in said cooling chamber and the velocity at which said vaporized cryogen is circulated through said cooling chamber over said article; and
k. controlling said velocity to cause said wind chill temperature to correspond to a desired wind chill temperature.

11. The method of claim 8 further comprising controlling introduction of additional liquid cryogen into said feed chamber to cause the temperature therein to correspond to a desired temperature.

12. A method of cooling an extrusion comprising:
a. disposing at least one calibrator in a generally enclosed cooling chamber, said calibrator having at least one cooling circuit;
b. feeding said extrusion through an opening provided through each of said cooling chamber and said at least one calibrator;
c. circulating a coolant through said at least one cooling circuit in said at least one calibrator to cool said extrusion;
d. circulating vaporized cryogen in said cooling chamber to cool at least one of said extrusion and said at least one calibrator;
e. introducing liquid cryogen into a feed chamber wherein said liquid cryogen is substantially vaporized to form said vaporized cryogen;
f. providing fluid communication from said feed chamber to said cooling chamber;
g. said vaporized cryogen being circulated from said feed chamber into said cooling chamber;
h. controlling introduction of additional liquid cryogen into said feed chamber to cause the temperature therein to correspond to a desired temperature;
i. first increasing said velocity to a maximum velocity to increase said rate of cooling of said article; and
j. thereafter introducing additional liquid cryogen only when necessary to at least one of maintain and increase said rate of cooling such that a maximum cooling rate is achieved using a minimum amount of liquid cryogen.

13. The method of claim 12 further comprising heating at least one of said feed chamber and said cooling chamber to increase the temperature therein to cause the temperature therein to correspond to said desired temperature.

14. The method of claim 13 wherein efficiency is optimized comprising:
a. first decreasing said velocity to decrease said rate of cooling; and
b. thereafter increasing the temperature in at least one of said feed chamber and said cooling chamber only when necessary to at least one of maintain and decrease said rate of cooling such that a desired rate of cooling is achieved using a minimum amount of energy.

15. The method of claim 8 further comprising venting pressure build-up in at least one of said feed chamber and said cooling chamber due to at least said introducing said liquid cryogen in said feed chamber.

16. The method of claim 10 wherein said feed chamber and said cooling chamber are a plurality of feed chambers and cooling chambers and each of said plurality of feed chambers is individually controllable to at least one of introduce said liquid nitrogen, vaporize said liquid cryogen, and circulate said vaporized cryogen at a controllable velocity, said method further comprising:
a. sensing the temperature in each of at least one of said plurality of feed and cooling chambers;
b. calculating the wind chill temperature in each of said plurality of cooling chambers; and
c. individually controlling introduction of additional liquid cryogen into each of said plurality of feed chambers to cause the temperature in said each of at least one of said plurality of feed and cooling chambers to correspond to a desired temperature.

17. The method of claim 16 wherein cooling efficiency is optimized comprising:
a. first increasing said velocity to a maximum velocity to increase said rate of cooling of said article; and
b. thereafter introducing additional liquid cryogen only when necessary to at least one of maintain and increase said rate of cooling such that a maximum cooling rate is achieved using a minimum amount of liquid cryogen.

18. The method of claim 17 further comprising heating each of said at least one of said plurality of feed and cooling chambers to increase the temperature therein to cause the temperature to correspond to said desired temperature.

19. The method of claim 18 wherein efficiency is optimized comprising:
a. first decreasing said velocity to decrease said rate of cooling; and
b. thereafter increasing the temperature in each of at least one of said plurality of feed and cooling chambers only when necessary to at least one of maintain and decrease said rate of cooling such that a desired rate of cooling is achieved using a minimum amount of energy.

20. The method of claim 8 wherein said article is one of a plurality of individual articles and a generally continuously produced article, the method further comprising feeding said one of a plurality of individual articles and a generally continuously produced article through said cooling chamber for cooling thereof.

21. The method of claim 8 further comprising diffusing vaporized cryogen in said cooling chamber such that said vaporized cryogen is circulated over said article from more than one direction in said cooling chamber.

22. An apparatus for cooling an article comprising:
a. a cooling chamber;
b. at least one source of vaporized cryogen;
c. first means for circulating at least one of air and said vaporized cryogen in said cooling chamber, said first means for circulating in communication with said at least one source of vaporized cryogen;
d. at least one calibrator disposed in said cooling chamber, said at least one calibrator having at least one cooling circuit therein;
e. second means for circulating said vaporized cryogen through said at least one cooling circuit, said second means for circulating in communication with said at least one source of vaporized cryogen; and
f. at least one controller for controlling at least one of said first and second means for circulating such that said article is cooled in said cooling chamber and by said at least one calibrator.

23. The apparatus of claim 22 further comprising:
a. a feed chamber in communication with at least one of said cooling chamber and said cooling circuit;
b. an inlet into said feed chamber in fluid communication with a source of liquid cryogen; and
c. a valve disposed between said inlet and said source of liquid cryogen, said valve controllable by said controller to admit said liquid cryogen into said feed chamber wherein said liquid cryogen vaporizes to create said at least one source of vaporized cryogen; and
d. at least one of said first and second means for circulating circulates said vaporized cryogen through at least one of said cooling chamber and said cooling circuit.

24. An apparatus for cooling an article comprising:
a. a cooling chamber;
b. a source of vaporized cryogen in communication with said cooling chamber;
c. means for circulating at least one of air and said vaporized cryogen in said cooling chamber;
d. at least one calibrator disposed in said cooling chamber, said at least one calibrator having at least one cooling circuit therein;
e. a source of coolant in communication with said at least one cooling circuit;
f. means for circulating coolant through said at least one cooling circuit;
g. least one controller for controlling at least one of said means for circulating said vaporized cryogen in said cooling chamber and said means for circulating said coolant in said cooling circuit such that said article is cooled in said cooling chamber and by said at least one calibrator;
h. a feed chamber in communication with said cooling chamber;
i. an inlet into said feed chamber in fluid communication with said source of liquid cryogen;
j. a valve disposed between said inlet and said source of liquid cryogen, said valve controllable by said controller to admit said liquid cryogen into said feed chamber wherein said liquid cryogen vaporizes to create said source of vaporized cryogen;
k. said means for circulating circulates said vaporized cryogen into said cooling chamber from said feed chamber;
l. a temperature sensor for sensing temperature in at least one of said feed chamber and said cooling chamber;
m. said means for circulating controllable to circulate said vaporized cryogen over said article at a selected velocity to create a selected wind chill temperature in said cooling chamber; and
n. a controller connected to said temperature sensor, said controller controlling said means for circulating to cause said wind chill temperature to correspond to a desired wind chill temperature.

25. The apparatus of claim 24 further comprising said valve controllable by said controller to introduce said liquid cryogen into said feed chamber to cause the temperature in at least one of said feed chamber and said cooling chamber to correspond to a desired temperature.

26. The apparatus of claim 23 wherein apparatus further comprises:
a. a return chamber communicating with a return side of said means for circulating;
b. at least one return passage connecting said cooling chamber and said return chamber, said at least one return passage providing fluid communication therebetween; and
c. said means for circulating further circulating said vaporized cryogen from said central cooling chamber to said return chamber via said at least one return passage.

27. The apparatus of claim 26 wherein said at least one intake passage and at least one return passage further comprise at least two intake passages and at least two return passages.

28. The apparatus of claim 23 further comprising:
a. a pair of openings provided in generally opposing sides of said cooling chamber through which an article to be cooled may be passed to be cooled in said central cooling chamber; and
b. a seal at each of said pair of openings to maintain said cooling chamber generally sealed from the atmosphere.

29. The apparatus of claim 23 further comprising a heating unit disposed in at least one of said feed chamber and said cooling chamber, said heating unit controllable by said controller to raise the temperature in at least one of said feed chamber and said cooling chamber to cause the temperature therein to correspond to a desired temperature.

30. The apparatus of claim 23 further comprising a vent in communication with at least one of said feed chamber and said cooling chamber to release pressure therein resultant from at least vaporization of said liquid cryogen therein when said pressure reaches a predetermined level.

31. An apparatus for cooling an article comprising:
a. a cooling chamber;
b. a source of vaporized cryogen in communication with said cooling chamber;
c. means for circulating at least one of air and said vaporized cryogen in said cooling chamber;
d. at least one calibrator disposed in said cooling chamber, said at least one calibrator having at least one cooling circuit therein;
e. a source of coolant in communication with said at least one cooling circuit;
f. means for circulating coolant through said at least one cooling circuit;
g. at least one controller for controlling at least one of said means for circulating said vaporized cryogen in said cooling chamber and said means for circulating said coolant in said cooling circuit such that said article is cooled in said cooling chamber and by said at least one calibrator;

h. a feed chamber in communication with said cooling chamber;

i. an inlet into said feed chamber in fluid communication with said source of liquid cryogen;

j. a valve disposed between said inlet and said source of liquid cryogen, said valve controllable by said controller to admit said liquid cryogen into said feed chamber wherein said liquid cryogen vaporizes to create said source of vaporized cryogen;

k. said means for circulating circulates said vaporized cryogen into said cooling chamber from said feed chamber; and l. optimizing cooling efficiency by initially controlling said means for circulating to circulate said vaporized cryogen at a maximum velocity to maximize said wind chill temperature prior to controlling said valve to introduce additional liquid cryogen to lower the temperature in at least one of said feed chamber and said cooling chamber such that maximum cooling is provided utilizing a minimum of liquid cryogen.

32. The apparatus of claim 23 further comprising:

a. a diffuser positioned within said cooling chamber and generally surrounding said article disposed therein, said diffuser having multiple openings therein; and b. said means for circulating further circulating said vaporized cryogen through said diffuser and said multiple openings to channel said vaporized cryogen towards said article from more than one direction.

33. The apparatus of claim 25 wherein:

a. said feed chamber and said cooling chamber further comprise a plurality of feed and cooling chambers, each of said plurality of feed chamber having at least said source of liquid cryogen, said inlet, said valve, said means for circulating, and said temperature sensor; and b. said controller providing a desired temperature in each of said plurality of feed and cooling chambers independently of others of said plurality of feed and cooling chambers.

34. The apparatus of claim 33 wherein said controller further comprises a plurality of controllers, each of said plurality of controllers associated with a respective one of said plurality of feed and cooling chambers.

35. A method of cooling an extrusion comprising:

a. disposing at least one calibrator in a generally enclosed cooling chamber, said calibrator having at least one cooling circuit;

b. feeding said extrusion through an opening provided through each of said cooling chamber and said at least one calibrator;

c. circulating a coolant through said at least one cooling circuit in said at least one calibrator to cool said extrusion;

d. circulating vaporized cryogen in said cooling chamber to cool at least one of said extrusion and said at least one calibrator;

e. circulating said vaporized cryogen at a controllable velocity in said cooling chamber to create a wind chill temperature to increase a rate of cooling of said extrusion;

f. sensing the temperature in said cooling chamber;

g. calculating said wind chill temperature in said cooling chamber, said wind chill temperature being a function of the temperature in the cooling chamber and the velocity at which said vaporized cryogen is circulated in said cooling chamber; and h. controlling said velocity to cause said wind chill temperature to correspond to a desired wind chill temperature.

36. The method of claim 35 further comprising;

introducing liquid cryogen into a feed chamber wherein said liquid cryogen is substantially vaporized to form said vaporized cryogen;

circulating said vaporized cryogen from said feed chamber through at least one of said cooling chamber and said cooling circuit; and controlling introduction of liquid cryogen into said feed chamber to cause the temperature in said cooling chamber to correspond to a desired temperature.

37. The method of claim 36 wherein cooling efficiency is optimized comprising:

a. first increasing said velocity to a maximum velocity to increase said rate of cooling of said article; and b. thereafter introducing additional liquid cryogen as necessary to at least one of maintain and increase said rate of cooling such that a maximum cooling rate is achieved using a minimum amount of liquid cryogen.

38. The method of claim 37 further comprising heating said cooling chamber to increase the temperature therein to cause the temperature in said cooling chamber to correspond to said desired temperature.

39. The method of claim 38 wherein efficiency is optimized comprising:

a. first decreasing said velocity to decrease said rate of cooling; and b. thereafter increasing the temperature in said cooling chamber as necessary to at least one of maintain and decrease said rate of cooling such that a desired rate of cooling is achieved using a minimum amount of energy.

40. The method of claim 35 further comprising venting pressure build-up in said cooling chamber due to at least said introducing said liquid cryogen in said chamber.

41. The method of claim 36 wherein said cooling chamber is a plurality of cooling chambers each individually controllable to at least one of introduce said liquid nitrogen, vaporize said liquid cryogen, circulate said liquid cryogen at a controllable velocity, sense the temperature, and calculate the wind chill temperature, said method further comprising individually controlling introduction of additional liquid cryogen into selected ones of said plurality of cooling chambers to cause the temperature in said selected ones to correspond to a desired temperature for said selected ones.

42. The method of claim 41 wherein cooling efficiency is optimized comprising:

a. first increasing said velocity to a maximum velocity in said selected ones to increase said rate of cooling of said article; and b. thereafter introducing additional liquid cryogen as necessary to at least one of maintain and increase said rate of cooling such that a maximum cooling rate is achieved using a minimum amount of liquid cryogen.

43. The method of claim 42 further comprising heating said selected ones to increase the temperature therein to cause the temperature in said selected ones to correspond to said desired temperature for said selected ones.

44. The method of claim 43 wherein efficiency is optimized comprising:

a. first decreasing said velocity to decrease said rate of cooling in said selected ones; and b. thereafter increasing the temperature in said selected ones as necessary to at least one of maintain and decrease said rate of cooling such that a desired rate of cooling for said selected ones is achieved using a minimum amount of energy.

45. The method of claim 35 wherein said article is one of a plurality of individual articles and a generally continuously produced article, the method further comprising feeding said one of a plurality of individual articles and a generally continuously produced article through said cooling chamber for cooling thereof.

46. The method of claim 35 further comprising diffusing vaporized cryogen in said cooling chamber such that said vaporized cryogen is circulated over said article from more than one direction in said cooling chamber.

47. An apparatus for cooling an article comprising:

a. a cooling chamber;

b. a source of vaporized cryogen in communication with said cooling chamber;

c. means for circulating at least one of air and said vaporized cryogen in said cooling chamber;

d. at least one calibrator disposed in said cooling chamber, said at least one calibrator having at least one cooling circuit therein;

e. a source of coolant in communication with said at least one cooling circuit;

f. means for circulating coolant through said at least one cooling circuit;

g. at least one controller for controlling at least one of said means for circulating said vaporized cryogen in said cooling chamber and said means for circulating said coolant in said cooling circuit such that said article is cooled in said cooling chamber and by said at least one calibrator;

h. a source of liquid cryogen;

i. an inlet connecting said source of liquid cryogen with said cooling chamber;

j. a valve controllable to admit liquid cryogen into said cooling chamber through said inlet wherein said liquid cryogen vaporizes to form said vaporized cryogen;

k. a temperature sensor for sensing the temperature in said cooling chamber;

l. means for circulating in communication with said cooling chamber for at least one of enhancing vaporization of said liquid cryogen and circulating vaporized cryogen in said cooling chamber at a controllable velocity to create a wind chill temperature in said cooling chamber; and m. a controller connected to said sensor and controlling said means for circulating at variable speeds to cause said wind chill temperature to correspond to a desired wind chill temperature.

48. The apparatus of claim 47 further comprising said valve controllable by said controller to introduce said liquid cryogen into said cooling chamber to cause the temperature therein to correspond to a desired temperature.

49. The apparatus of claim 47 wherein said cooling chamber further comprises:

a. a central cooling chamber;

b. a feed chamber;

c. at least one intake passage connected between said feed and cooling chambers and providing fluid communication therebetween;

d. said inlet communicating with said feed chamber and said liquid cryogen introduced therein via said valve; and e. said means for circulating further circulating said vaporized cryogen from said feed chamber through said central cooling chamber via said at least one intake passage.

50. The apparatus of claim 49 wherein said cooling chamber further comprises:

a. a return chamber, said return chamber communicating with a return side of said means for circulating;

b. at least one return passage communicating between said central cooling chamber and said return chamber; and c. said means for circulating further circulating said vaporized cryogen from said central cooling chamber to said return chamber via said at least one return passage.

51. The apparatus of claim 50 wherein said at least one intake passage and at least one return passage further comprise at least two intake passages and at least two return passages.

52. The apparatus of claim 47 further comprising:

a. a pair of openings provided in generally opposing sides of said cooling chamber through which an article to be cooled may be passed to be cooled in said central cooling chamber; and b. a seal at each of said pair of openings to maintain said cooling chamber generally sealed from the atmosphere.

53. The apparatus of claim 47 further comprising a heating unit disposed in said cooling chamber controllable by said controller to raise the temperature in said cooling chamber to cause the temperature to correspond to a desired temperature.

54. The apparatus of claim 47 further comprising a vent in communication with said cooling chamber to release pressure therein resultant at least from vaporization of liquid cryogen therein when said pressure reaches a predetermined level.

55. The apparatus of claim 47 further comprising optimizing cooling efficiency by initially controlling said means for circulating to circulate said vaporized cryogen at a maximum velocity to maximize said wind chill temperature prior to controlling said valve to introduce additional liquid cryogen to lower the temperature in said cooling chamber such that maximum cooling is provided utilizing a minimum of liquid cryogen.

56. The apparatus of claim 47 further comprising;

a. a diffuser positioned in said cooling chamber intermediate said article to be cooled and a region in said cooling chamber whereat said liquid cryogen is introduced, said diffuser having multiple openings directed towards said article to be cooled in said cooling chamber;

b. said means for circulating further circulating said vaporized cryogen through said diffuser and said multiple openings thereof directing said vaporized cryogen is towards said article from more than one direction in said cooling chamber.

57. The apparatus of claim 47 wherein:
a. said cooling chamber further comprises a plurality of cooling chambers, each having at least said liquid cryogen source, said inlet, said valve, said temperature sensor, and said means for circulating; and
b. said controller individually controlling said means for circulating in each of said plurality of cooling chambers to cause said wind chill temperature in each of said cooling chambers to correspond to a desired wind chill temperature in each of said cooling chambers.

58. The apparatus of claim 57 wherein said controller further comprises a plurality of controllers, each of said plurality of controllers associated with a respective one of said plurality of said plurality of said cooling chambers.

* * * * *

UNITED STATES PATENT AND TRADEMARK OFFICE
CERTIFICATE OF CORRECTION

PATENT NO. : 6,363,730 B1  
DATED : April 2, 2002  
INVENTOR(S) : Michael R. Thomas and Robert H. Bessemer It is certified that error appears in the above-identified patent and that said Letters Patent is hereby corrected as shown below:

<u>Title page,</u>  
Item [56], References Cited, please add the following prior art references:

| | | |
|---|---|---|
| 2,984,631 | 5/1961 | Talalay et al. |
| 3,835,212 | 9/1974 | Piacente |
| 4,190,473 | 2/1980 | Soecknick et al. |
| 4,524,548 | 6/1985 | Klee et al. |
| 4,719,071 | 1/1988 | Capelle |
| 4,726,195 | 2/1988 | Klee |
| 4,475,351 | 10/1984 | Klee |
| 4,931,232 | 6/1990 | Lermuzeaux et al. |
| 5,054,292 | 10/1991 | Klee |
| 5,326,508 | 7/1994 | Kaefer et al. |
| 5,879,732 | 3/1999 | Caracciolo, Jr. et al. |
| 5,892,207 | 4/1999 | Kawamura et al. |
| 5,921,091 | 7/1999 | Foss et al. |

<u>Column 15,</u>  
Line 49, before "least", insert -- at --.

Signed and Sealed this

Third Day of September, 2002

*Attest:*

*Attesting Officer*

JAMES E. ROGAN  
*Director of the United States Patent and Trademark Office*